(12) United States Patent
Stojanovski et al.

(10) Patent No.: US 11,671,822 B2
(45) Date of Patent: Jun. 6, 2023

(54) UE CAPABILITIES PROVISIONING AND RETRIEVAL IN CELLULAR NETWORKS

(71) Applicant: APPLE INC., Cupertino, CA (US)

(72) Inventors: Alexandre Saso Stojanovski, Paris (FR); Ashish Singh, Munich (DE); Franz Goldhofer, Schaftlach (DE); Michael Zitzmann, Nuremberg (DE); Naveen Palle, San Diego, CA (US); Puneet Jain, Hillsboro, OR (US); Richard Burbidge, Santa Clara, CA (US); Sudeep Palat, Cheltenham (GB); Sudeep Manithara Vamanan, Nuremberg (DE); Sushant Kumar, Munich (DE); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/376,528

(22) Filed: Apr. 5, 2019

(65) Prior Publication Data

US 2019/0239064 A1  Aug. 1, 2019

Related U.S. Application Data

(60) Provisional application No. 62/655,691, filed on Apr. 10, 2018.

(51) Int. Cl.
*H04W 8/22* (2009.01)
*H04W 8/26* (2009.01)
(Continued)

(52) U.S. Cl.
CPC .............. *H04W 8/22* (2013.01); *H04W 8/08* (2013.01); *H04W 8/26* (2013.01);
(Continued)

(58) Field of Classification Search
CPC ........... H04W 8/22; H04W 8/08; H04W 8/26; H04W 76/27; H04W 36/0022; H04W 36/0027; H04W 60/00
See application file for complete search history.

(56) References Cited

U.S. PATENT DOCUMENTS

2018/0262905 A1* 9/2018 Dhanapal ................ H04W 8/24
2019/0007500 A1* 1/2019 Kim ...................... H04L 67/141
(Continued)

FOREIGN PATENT DOCUMENTS

EP          3007475        4/2016

OTHER PUBLICATIONS

Starsinic, Michael, et al., An IP-Based Triggering Method for LTE MTC Devices, Apr. 2015, IEEE, 2015 Wireless Telecommunications Symposium, pp. 1-6 (Year: 2015).*

*Primary Examiner* — Kent Krueger
(74) *Attorney, Agent, or Firm* — Fay Kaplun & Marcin, LLP

(57) ABSTRACT

An apparatus of a user equipment (UE) comprises one or more baseband processors to encode a unique UE identifier to be transmitted to an Access and Mobility Function (AMF) of a Fifth Generation (5G) network, wherein the unique identifier identifies UE capabilities to be stored in a UE capabilities database. An apparatus of Access and Mobility Function (AMF) of a Fifth Generation (5G) network comprises one or more processors to receive a user equipment (UE) Capabilities update from a remote server to update a UE capability database that stores UE capability information corresponding to one or more UEs identified with a unique identifier, and to process the UE Capabilities update via one or more Application Programming Interfaces (APIs).

19 Claims, 12 Drawing Sheets

(51) Int. Cl.
*H04W 8/08* (2009.01)
*H04W 36/00* (2009.01)
*H04W 76/27* (2018.01)
*H04W 60/00* (2009.01)

(52) U.S. Cl.
CPC ... *H04W 36/0022* (2013.01); *H04W 36/0027* (2013.01); *H04W 76/27* (2018.02); *H04W 60/00* (2013.01)

(56) References Cited

U.S. PATENT DOCUMENTS

| | | | |
|---|---|---|---|
| 2019/0110190 A1* | 4/2019 | Van Lieshout | H04W 8/24 |
| 2019/0191467 A1* | 6/2019 | Dao | H04W 76/12 |
| 2019/0313239 A1* | 10/2019 | Horn | H04L 5/14 |
| 2019/0349892 A1* | 11/2019 | Rico Alvarino | H04W 8/22 |

* cited by examiner

100

| DEVICE MANUFACTURER ID 110 | MODEL ID 112 | CAPABILITY ID 114 |

| DEVICE MANUFACTURER ID 110 | MODEL ID 112 | UE CAPABILITY SUBSET ID 710 | CAPABILITY ID 114 |

FIG. 7

UE CAPABILITIES PROVISIONING AND RETRIEVAL IN CELLULAR NETWORKS

CROSS-REFERENCE TO RELATED APPLICATIONS

The present application claims the benefit of U.S. Provisional Application No. 62/655,691 filed Apr. 10, 2018. Said Application No. 62/655,691 is hereby incorporated herein by reference in its entirety.

BACKGROUND

In 3GPP system, UE radio capabilities need to be known to the radio access network (RAN) network nodes to configure the radio resource control (RRC) connection for communication. The state of the art in Third Generation Partnership Project (3GPP) systems is that the core network node, such as the mobility management entity (MME) in the evolved packet core (EPC) or Access and Mobility Function (AMF) in the Fifth Generation core (5GC), stores the user equipment (UE) capabilities including radio capabilities in the UE context for all UEs that are registered to it. The stored UE capabilities are provided to the RAN node as part of UE Context Setup from the core network node. This avoids the need for UEs to transfer UE capabilities every time it is connecting to a RAN node, but a UE still needs to provide its UE capabilities over the air at least during attach and a tracking area update to a new MME in Long-Term Evolution (LTE) systems. This mechanism is expected to be continued in registration procedure for the 5GC as well. The storage of UE Radio access capabilities in the core network is also done per registered UE. With each new 3GPP Release and addition of more carrier aggregation capabilities, the UE Radio access capabilities are increasing in size, typically going around 4000 bytes for a single 3GPP Release-12 UE. Storing such information per UE for a million subscribers in the core network is also a burden.

Recent discussion papers in 3GPP RAN2 put forward the idea of storing UE capability per model rather than per UE. Typically, in networks a few popular phone models make up the bulk of percentage of subscriber and all of them have same capabilities. Storing capabilities per model can be beneficial in two fronts. First, it reduces the storage burden on the network. Second, through the use of a UE identifier, it avoids the need for a second UE of the same model to transfer its capability during attach or a tracking area update in EPC or Registration procedure in 5GC.

It has been discussed to forward the idea of using Type Allocation Code (TAC) part of International Mobile Equipment Identity (IMEI) and IMEI Software Version (SV) as a potential UE identifier. The use of TAC part of IMEI as an identifier, however, is problematic in some scenarios. There may be cases when UEs need to advertise different capabilities according to the PLMN a given UE is connected to. Also, there may be cases where UEs need to advertise a certain profile depending on operating conditions. Use of a fixed identifier will take away these flexibilities from the UE. In addition, the method of retrieving UE capabilities from the first UE in the network and using it to store UE capabilities for that UE model spawns the risk of a rogue UE overriding capabilities of a UE model.

In 4G/LTE technology, the carrier aggregation (CA) band combinations reporting in "UE Capability Information" is potentially a difficulty for UE vendors because it was not foreseen in advance by the 3GPP standards how much the combinations of CA "band combinations" would increase in the future and the different kinds of problems that could arise as a side effect for a single LTE successful call setup in inter-operator testing and/or approvals among different network vendors and their different implementations.

In LTE RAT, the size of UE Capability has exploded due to a large number of possible band combinations, which often the network may not able to handle due to large size, and the network silently releases the RRC Connection as a fault defense. It is not possible for the UE to know why the network released the RRC Connection after sending UE Capability Information to network because there is no specific cause provided in the rrcConnectionRelease message, which can help UE to understand simply that issue is in the UE reported band combinations in the UECapabilityInformation message.

LTE call setup failure can occur due to the time needed to perform the computation involved to do band combinations processing in the UE, and the network (NW) timer for receiving the UECapabilityInformation message may expire which eventually leads to LTE call setup failure. In multi RAT modems, due to very large LTE Capability, even 3G call setup can fail because the UEs are not able to send the response in a timely manner when the NW demands 4G capabilities along with 3G RAT capabilities.

Overall LTE Call setup time can increase significantly even in the successful call setup use cases. This is also a difficulty for vendors because customers compare the device under test (DUT) with an older release, with support of less Carrier aggregation in the downlink or uplink, of the same vendors or other vendors where the UE is taking less time for LTE call setup. If the CA trend continues to increase, then it will be a challenge for the modem vendor to meet the customer requirements for call setup timing key performance indicators (KPIs).

The maximum number of band combinations which can be reported by the UE to the NW is fixed. For example, in 3GPP Release-13 a maximum of 384 band combinations can be reported even though UE supports much more than 384 band combinations. This limit in 3GPP standard might have also been introduced to overcome the large size of band combination issue.

In LTE, UE RRC has to build the band combination information every time when a UECapabilityEnquiry is received because of band combination filtering algorithm's input parameters need which are run time requirements, for example the current public land mobile network (PLMN) and so on. Higher resources can be involved to transfer large UECapabilityInformation message at air interface level, that is less optimized use of air interface resources. Very high research and development efforts can be involved for UE and NW vendors and inter operator testing (IOT) efforts for defect tracking, log analysis, development, multiple level of testing, and retesting perspective due to CA band combination feature issues. In summary, large UE capability information message size can result from a large contribution of LTE Carrier Aggregation band combinations, which can be problematic because of the way it is handled in 3GPP standards for LTE.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 1 is a diagram of a structure of a UE Radio Capability Identifier (URCI) in accordance with one or more embodiments.

FIG. 7 is a diagram of UE Identifier partitioning including a UE Capability subset identifier in accordance with one or more embodiments.

Figure 2:
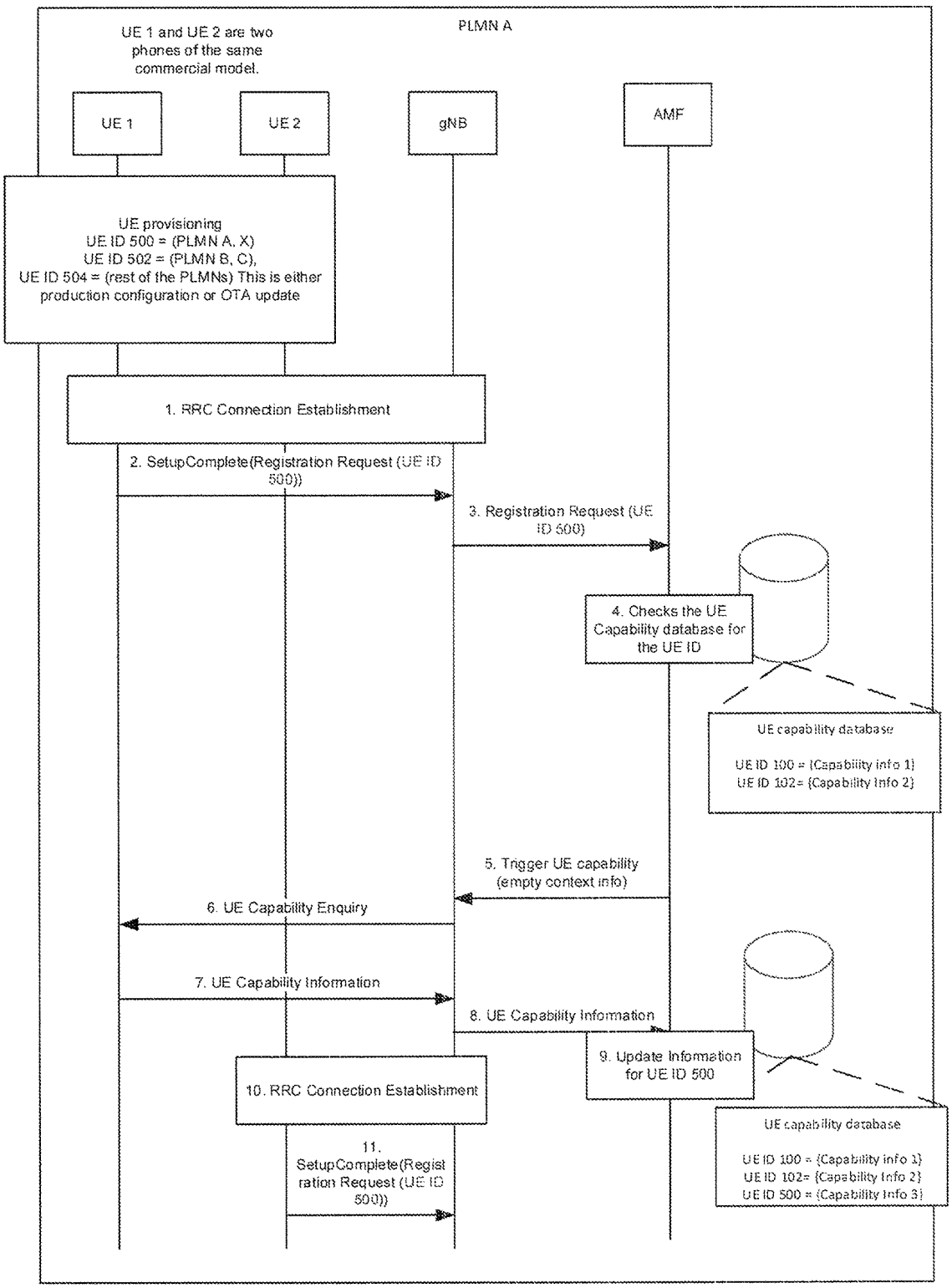
FIG. 2 is a diagram a message sequence describing Model Identifier based Capability storage in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a structure of a UE Radio Capability Identifier (URCI) in accordance with one or more embodiments will be discussed. FIG. 1 shows a user equipment (UE) Radio Capability Identifier (URCI) 100 that can comprise a standardized UE identifier to correspond to a UE model and an operating profile of the UE. Using the International Mobile Equipment Identity (IMEI) as a UE Identifier can be disadvantageous. For example, a device manufacturer might want to have different sets of capabilities for the same model on different networks. Also, a UE might want to indicate a different operating profile with a set of capabilities different, and not necessarily restricted, from the capabilities normally associated with its model. In these scenarios a fixed IMEI like identifier may not be useful.

The URCI 100 comprises a Device Manufacturer Identifier (ID) 110, a Model Identifier (ID) 112, and a Capability Identifier (ID) 114. The Device Manufacturer ID 110 portion provides the identification of a device manufacturer or owner of the UE identifier definition. The values in this portion of URCI 100 can be standardized at the system level. The Model ID 112 portion identifies a unique model from a given device manufacturer. The values within this section can be assigned by the device manufacturer. The Capability ID 114 portion identifies device access stratum capability for a given model as defined by the device manufacturer.

In one example embodiment, referred to herein as Alternative 1, URCI 100 can be defined to be of length 48 bits of which the Most Significant 16 bits are defined as the device manufacturer specific portion corresponding to Device Manufacturer ID 110, the next 16 bits are defined as the Model ID 112 portion, and the least significant 16 bits are defined as the Capability ID 114 or profile identifier for a given model of UE. In some embodiments Model ID 112 portion may not be needed if the device can be uniquely identified by the Device Manufacturer ID 110 portion. In certain embodiments, fields of different lengths maybe used instead of using the same 16 bit length for all fields.

In another example embodiment, referred to herein as Alternative 2, Device Manufacturer ID 110 and Model ID 112 can be derived from the Type Allocation Code (TAC) field in the International Mobile Equipment Identity (IMEI), IMEI Software Version (IMEISV), or Permanent Equipment Identifier (PEI), or the TAC field identifying the device manufacturer and the "Capability ID" identifying a set of UE access stratum capabilities as defined by the device manufacturer.

As discussed herein, using URCI 100 can provide a secure way of transferring UE capabilities such that a rogue UE cannot override the capabilities for a model. Furthermore, another method of UE capability retrieval in a Third Generation Partnership Project (3GPP) network is described herein, which avoids transferring the UE Capabilities even once over the air. In one or more embodiments, the utilization of URCI 100 as a UE Capability ID may be implemented for Fifth Generation (5G) wireless systems but can also be equally applicable to Fourth Generation (4G) Long-Term Evolution (LTE) systems. In such embodiments described herein, the 5G system can be replaced by a 4G LTE system. For example, a next generation NodeB (gNB) can be replaced by an evolved NodeB (eNB), and the Access and Mobility Function (AMF) can be replaced by a Mobility Management Entity (MME). Furthermore, instead of the 5G Non-Access Stratum (NAS) messages, or registration message, the 4G NAS message such as Attach/Tracking Area Update is used to carry UE Capability ID from the UE to the eNB to the MME. Alternatively, the UE Capability ID can be sent from the UE to the eNB in ab LTE Radio Resource Control (RRC) message and from the eNB to the MME in an S1-AP Initial UE message.

The UE Identifier defined by the device manufacturer can be configured to correspond to different operating profiles for the same device under different conditions. The asymmetric cryptography based mechanism can be used to prevent a rogue device from maliciously providing UE capability aiming to override the genuine capabilities of that model and to prevent service disruption for a genuine UE model from an accidental use of the same UE identifier by a device that did not undergo type approval. The 3GPP network interface defined for transferring UE capabilities helps Original Equipment Manufacturers (OEMs) and other device manufacturers to pre-provision UE Capabilities prior to deployment of a device.

The framework for UE Capability exchange using URCI 100 can be as follows. First, URCI 100 can be used to avoid transferring the same UE capability content which is likely from different UEs of the same model. In typical LTE networks only about 15 to 20 different UE models account for 50% of the UE population. Second, URCI 100 can be used to reduce the storage requirement in Core Network. Currently, UE capability is stored per UE context for all registered UEs. This storage can be reduced to just the UE capability per UE model.

Each UE model can identify itself using the URCI 100 as the UE ID that unique for the UE model and which the network also understands. The network has a storage of UE capability per UE ID. In some embodiments, URCI 100 use a subset of digits of the IMEISV to serve as a UE ID. In alternative embodiments, Alternatively, URCI 100 can comprise an ID like a Media Access Control (MAC) addresses which can also be used to identify the manufacturer from the address.

In one or more embodiments, an example provisioning of URC 100 as a UE identifier can be as follows. The Device Manufacturer ID 110 is "5", the UE Model ID 112 is "0", and the UE has three different Capability ID 114 profiles, "0", "2", and "4", for use in different Public Land Mobile Networks (PLMNs). In such an arrangement, the URCI 110 can be provisioned as:

UE Identifier=
  500 {PLMN A, PLMN X}
  502 {PLMN B, PLMN C}
  504 {any other PLMN}

Such a provisioning can be made at production time or can be updated through Over the Air (OTA) procedures. An example method using this provisioning arrangement is shown in and described with respect to FIG. 2, below.

Referring now to FIG. 2, a diagram a message sequence describing Model Identifier based Capability storage in accordance with one or more embodiments will be discussed. In the example of FIG. 2, UE 1 and UE 2 can be two phones of the same commercial model, although the scope of the claimed subject matter is not limited in this respect. Method 200 may implement Alternative 1 as discussed, above, also may implement Alternative 2 is some embodiments. In method 200 as shown in FIG. 2, when a network does not have a stored capability for the UE Identifier indicated by an attaching or registering UE, the network retrieves the UE capability over the air from the UE. Using Alternative 1, the Access and Mobility Function (AMF) queries the first UE that reports a UE ID or URCI 100 for which the AMF does not have the UE Capability Information.

Figure 3:
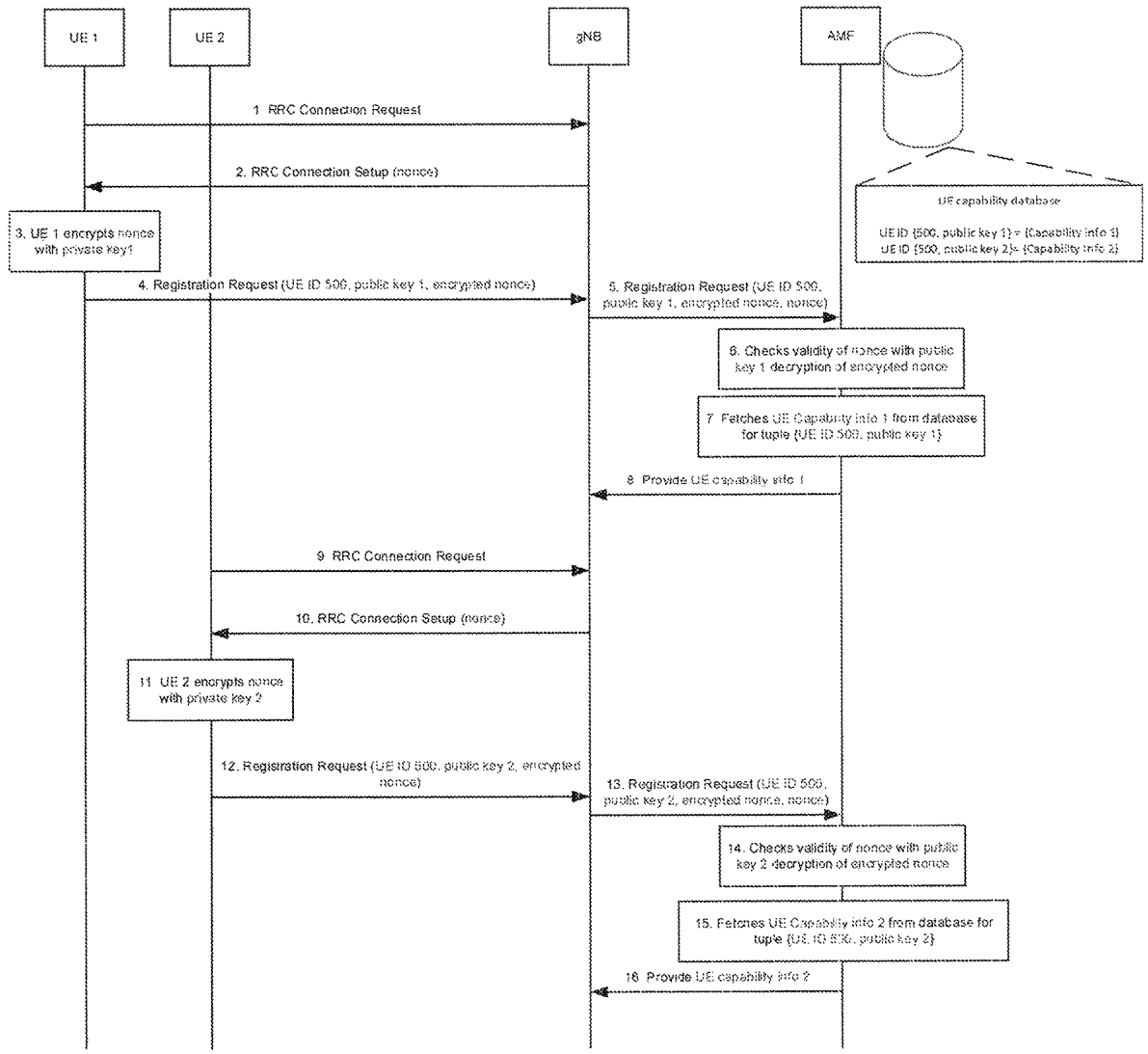
FIG. 3 is a diagram of a public key based validation of a UE Identifier in accordance with one or more embodiments.

Referring now to FIG. 3, a diagram of a public key based validation of a UE Identifier in accordance with one or more embodiments will be discussed. In some instances, there could be a potential risk where a rogue UE with a valid subscription to a PLMN maliciously identifies itself with a UE ID of a genuine model and overwrites the capabilities for all genuine UEs. There may also be a scenario wherein a device that did not undergo type approval accidentally uses the same UE ID as a genuine UE model. This scenario potentially can cause service disruption for the genuine device if the rogue device has attached or registered first to the core network. Method 300 of FIG. 3 can operate to mitigate this risk.

In one or more embodiments, the UE is provisioned with infrastructure for asymmetric key cryptography by the device manufacturer. The UE capability storage in the core network will be identified as a triplet of information consisting of UE Identifier, Public Key, and UE capability information. When the network sends RRC Connection setup (Message 4 per 3GPP convention) to the UE, it includes a NONCE for the UE to encrypt using its private key. In the RRC Connection Setup complete (Message 5) the UE includes its UE identifier, its public key, and the NONCE encrypted using its private key. Method 300 does not rely on 3GPP security context and can be used prior to NAS and AS security activation.

In an alternative embodiment, the public key may be left out of Message 5. For this case, the network would have the task to describe the received NONCE multiple times for each UE ID 500 it finds in the database and pick the entry where the decrypted NONC matches the NONCE that was sent. The public key would be delivered one time from the UE in an initial registration if there is no match, or provision the public key in the database. For any following registrations of the same UE, the public key could be left out from UE signaling.

The network (gNB or AMF) could decrypt the NONCE using the public key and validate the UE to be in possession of the right private key. The UE identifier and public key can be checked against the database of UE Capability storage. Thus, there is no risk that a rogue UE could maliciously use a UE identifier for a genuine UE model and overwrite its capability. A second UE providing the same UE Identifier but with a different public key is accepted by the network, but its capabilities will create another entry in the database with the different public key.

Figure 4:
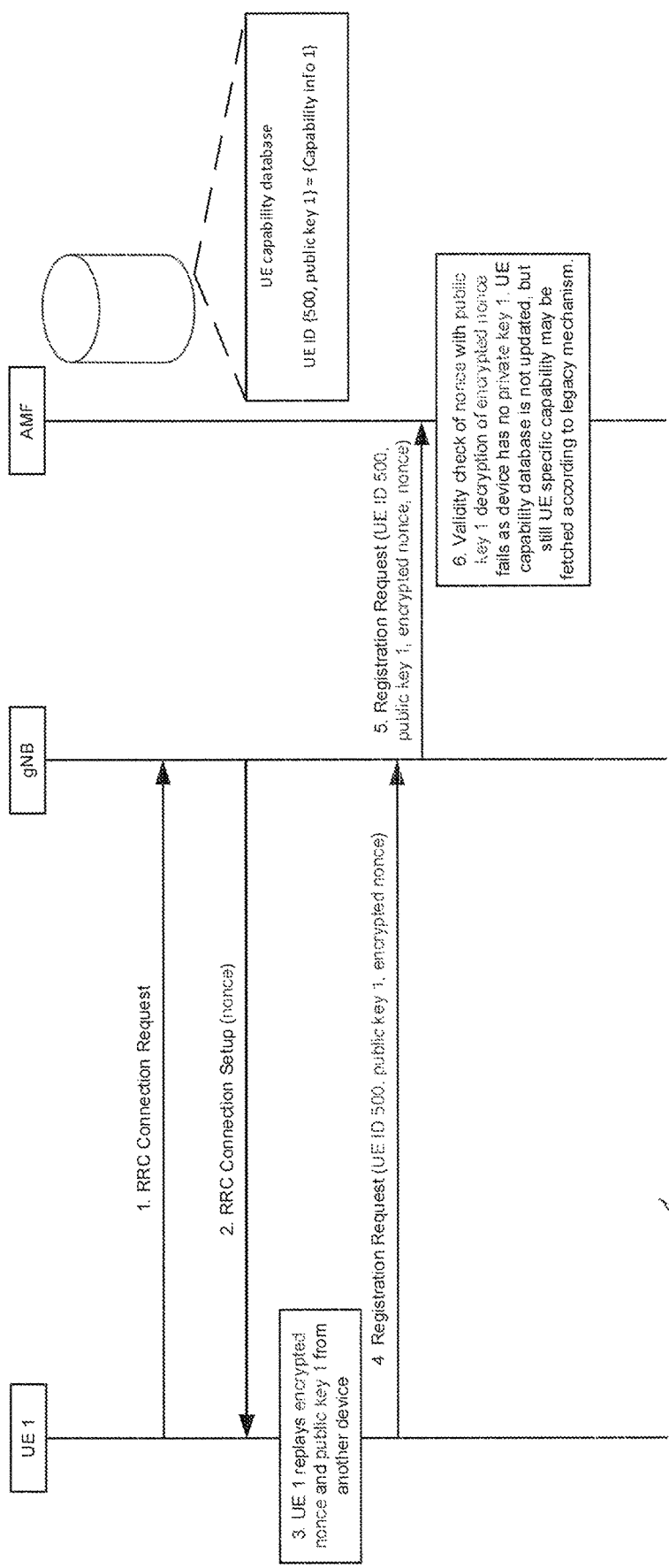
FIG. 4 is a diagram of a rouge UE providing the UE Identifier of a different vendor in accordance with one or more embodiments.

Referring now to FIG. 4, a diagram of a rouge UE providing the UE Identifier of a different vendor in accordance with one or more embodiments will be discussed. As shown in method 400 of FIG. 4, a UE may indicate its capability for asymmetric cryptography based encryption of NONCE in the RRC Connection Request (1 bit indication). This would allow the gNB to decide whether to include NONCE in the RRC Connection Setup message.

In another example using method 400, the gNB can always include the NONCE in RRC Connection setup with no capability indication from the UE in RRC Connection request. In this case the UE indicates UE Identifier and no public key in the msg5 (RRC Connection Setup Complete).

In yet another example of using method 400, the UE capability for asymmetric cryptography is indicated in the RRC Connection setup complete message. The gNB initiates a UE Capability enquiry procedure with NONCE and expects the public key and encrypted NONCE in the response message. In the event the validity check of the NONCE with the public key fails because the UE does not have a private key, the UE capability database is not updated although UE specific capability still may be fetched according to a 3GPP legacy mechanism. This method involves an additional UE-gNB signaling interaction for obtaining the full information. Using method 400, the network can detect a rogue UE attempting to provide UE capability using UE Identifier of a different vendor.

Figure 5:
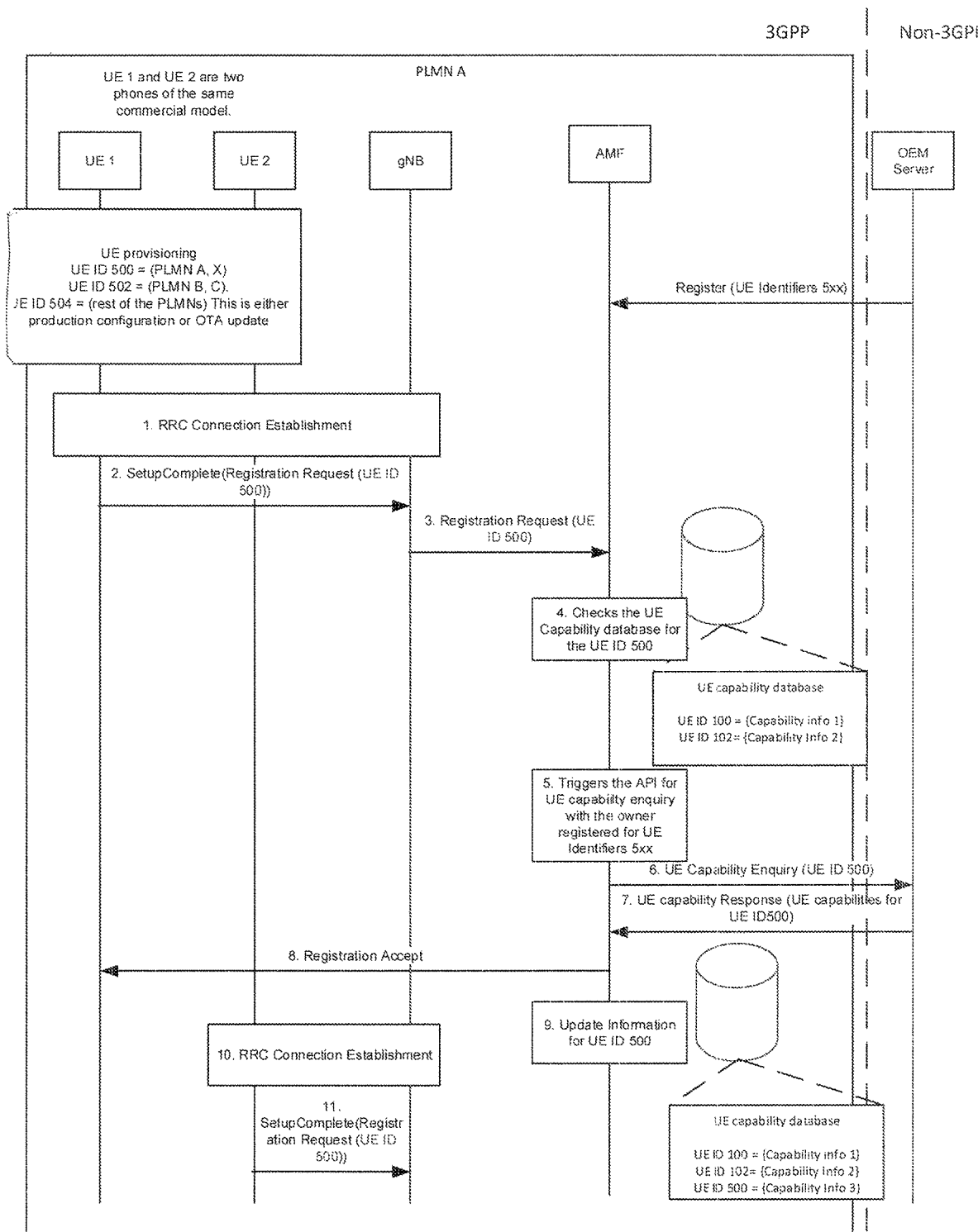
FIG. 5 is a diagram of interaction for UE capability retrieval from a registered device manufacturer in accordance with one or more embodiments.

Referring now to FIG. 5, a diagram of interaction for UE capability retrieval from a registered device manufacturer in accordance with one or more embodiments will be discussed. Method 500 of FIG. 5 shows and alternative approach of providing UE Capability information.

A set of northbound APIs is provided by 3GPP networks using the Common Application Programming Interface (CAPIF) framework. Method 500 of providing UE Capability information defines a new CAPIF based interface for OEMs, device manufacturers or owners of UE identifiers to provide UE Capability information referred to herein as Alternative 2. The interaction between a 3GPP Network and the external OEMs or device manufacturers can be categorized into the following types of APIs as shown in Table 1, below.

TABLE 1

APIs for Interacting with a Registered Device Manufacturer

| API Name | Parameters | Purpose | Direction |
| --- | --- | --- | --- |
| RegisterDeviceID | Device manufacturer ID | Allows the caller to register as owner of a give device manufacturer ID | Inbound |
| UE Capability Enquiry | Device manufacturer specific part of UE Identifier | To enquire UE capability for a given Model Identifier with a registered owner of a device manufacturer ID | Outbound |
| UE Capability Response | UE Id UE Capabilities, Public Key | This API provides the UE capabilities for a given UE identifier. This API can also provision the public key valid for all UEs configured to use the given UE identifier | Inbound |
| UE Capability Update | UE Id UE Capabilities, Public Key | This is a proactive push API for updating UE capabilities. This interface is allowed only for registered owners of a device manufacturer ID. | Inbound |
| UE Capability Delete | UE Id | This is a proactive push API requesting delete of any stored UE Capabilities with this UE Id | Inbound |

Method 500 of FIG. 5 shows the interaction for getting this UE capability information using such an interface as described in Table 1.

Figure 6:
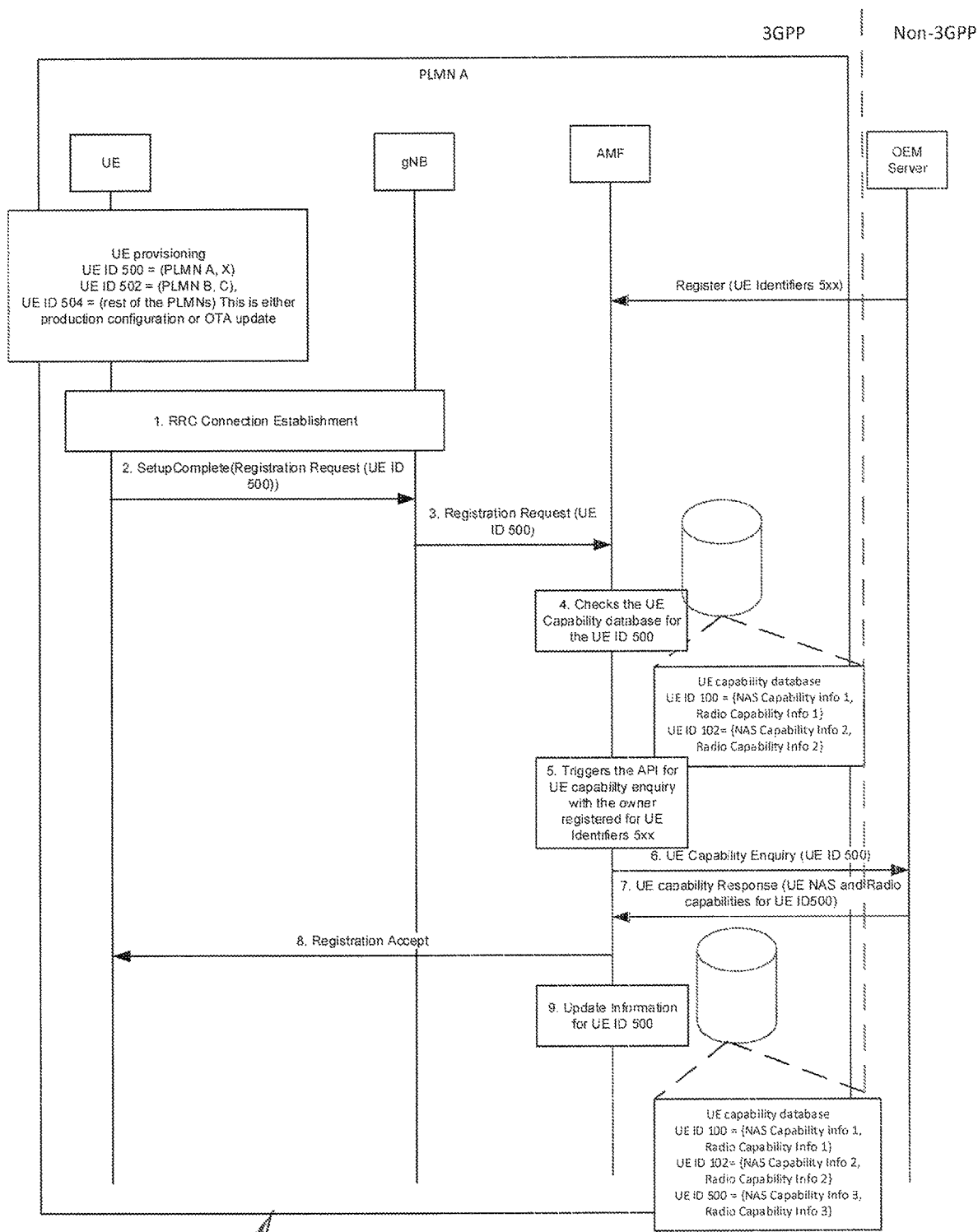
FIG. 6 is a diagram of a UE Identifier that corresponds to a set of Non-Access Stratum (NAS) and Radio Capabilities in accordance with one or more embodiments.

Referring now to FIG. 6, a diagram of a UE Identifier that corresponds to a set of Non-Access Stratum (NAS) and Radio Capabilities in accordance with one or more embodiments will be discussed. In another embodiment, the UE Capability Identifier also can be used for identifying NAS (Non-Access Stratum) Capabilities. In such an arrangement, the UE identifier can comprise a UE Capability Identifier (UCI) and corresponds to a set of NAS and Radio Capabilities for a given UE Model. In an arrangement, the UE context stored in core network contains a UCI which corresponds to a NAS and Radio Capabilities common to all UEs configured with this UCI.

An example interworking method 600 is shown in FIG. 6 where a UE provides a UCI 500 while performing Registration procedure. In contrast with method 500 of FIG. 5, the data storage consists of NAS and Radio capabilities for a UCI. In addition, in operation 7 of FIG. 6, the UE Capabilities provisioned includes a set of NAS capabilities and Radio Access Capabilities for UCI 500.

In method 600, there is a fixed mapping for UE NAS and Radio Capabilities to a given identifier. If one of the capabilities for a given model has to be modified, a new identifier can be used. In certain embodiments, an OEM server may also be deployed by the 3GPP operator.

Referring now to FIG. 7, a diagram of UE Identifier partitioning including a UE Capability subset identifier in accordance with one or more embodiments will be discussed. In another example, the UE identifier is partitioned to derive a unique identifier for UE NAS Capabilities (UNCI) and Radio Capabilities (URCI). In this case the UE identifier 700 can comprise an additional UE Capability subset identifier field 710.

In one example, the UE Capability subset identifier 710 can comprise a 2 bit field with the following definition:

| Bit 2 | Bit 1 | Definition |
| --- | --- | --- |
| 0 | X | Identifies UE Radio Capability |
| 1 | X | identifies UE NAS Capability |

In certain embodiments, the UE capability subset identifier 710 can be defined with a different field length.

Figure 8:
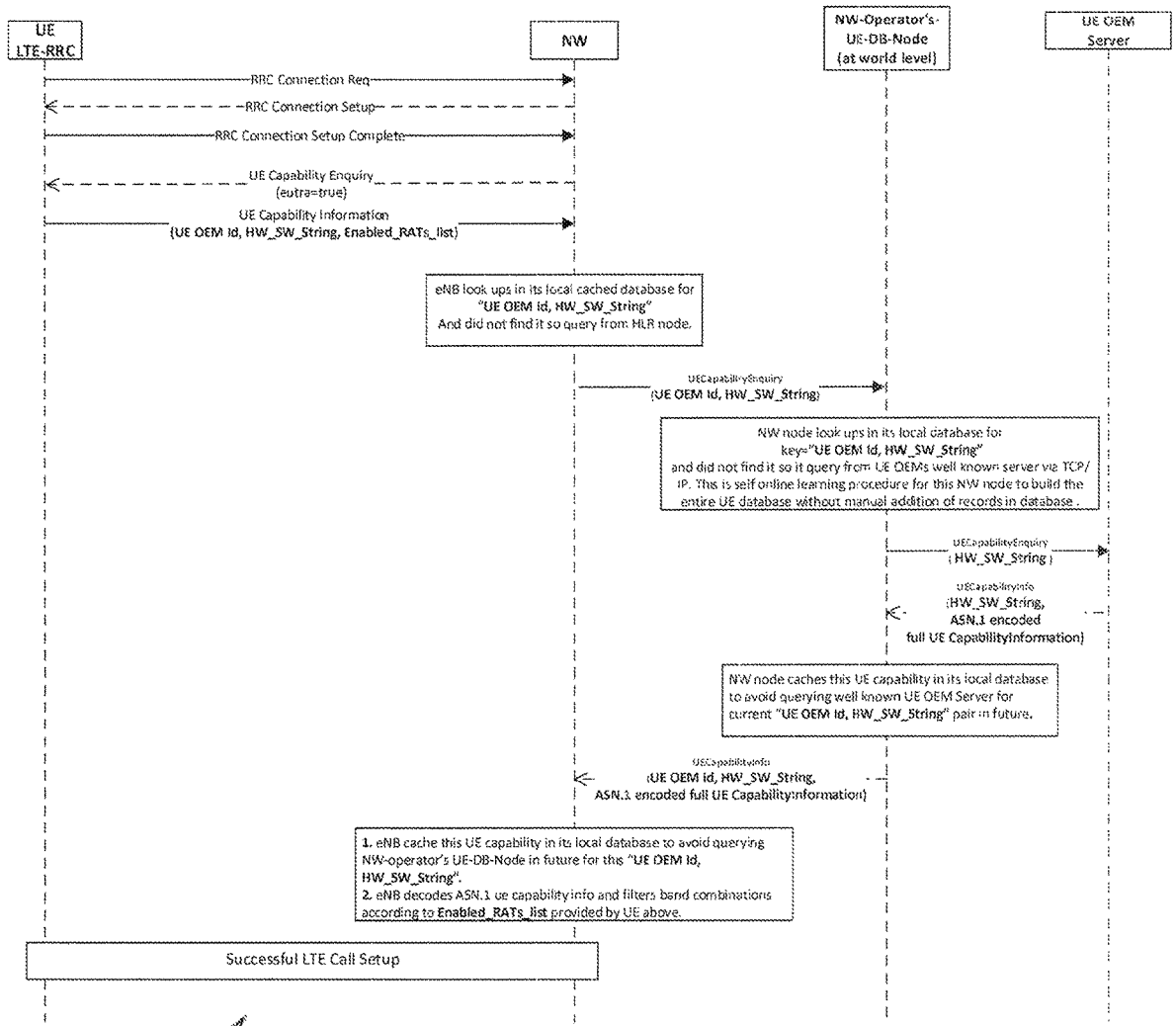
FIG. 8 is a diagram of UE Capability Enquiry/Information when a new type of UE does an ATTACH procedure in accordance with one or more embodiments.

Referring now to FIG. 8, a diagram of UE Capability Enquiry/Information when a new type of UE does an ATTACH procedure in accordance with one or more embodiments will be discussed. As shown in method 800 of FIG. 8, a message sequence chart shows the UE capability information exchange procedure when such a new UE (UE OEM ID, HW-SW-Release-String) does an ATTACH procedure to the network (NW) wherein this type of UE was never seen by this NW in past ever. In one or more embodiments the NW is self-learning and will build UE capability information database on the fly.

As discussed herein, optimization can be made regarding how the NW operator and the UE OEM can exchange the required data, which is UE capability full information), with minimum overhead for this data exchange between NW operator and UE OEM for UE capability information exchange.

In some embodiments, the UE capability information handling responsibility is shifted in majority towards network side. For example, the majority of the UE capability information will be already known at the NW side and only very little information will be exchanged over the air between the UE and the NW so that the NW easily can map the UE capability it has in its database node from the UE provided little information. In case the NW does not have the UE capability, this information can be retrieved from UE OEMs as an end to end technical solution. The solution is scalable considering 5G and upcoming future radio access technologies (RATs) where further frequency bands are going to be supported and hence further explosion of supported band combinations will happen, and which is to be exchanged at air interface level if the solution is not in place.

In one or more embodiments, there are two types of parameters considering UE capabilities that the UE sends to the Network while attaching (ATTACH) to the network or during radio resource connection (RRC) connection establishment procedure in Third Generation (3G) networks, Fourth Generation (4G) networks, and in Fifth Generation (5G) networks as well.

The first type of parameters are Class A parameters comprising UE capability parameters which are controlled or influenced by end users in the UE. For example, such parameters can include an Enabled RATs list because an end user may disable some RATs in the user interface of the mobile phone, but the supported RATs may be more than the enabled RATs.

The second type of parameters are Class B parameters comprising UE capability parameters which are controlled by OEMs per hardware and/or software release. For example, such parameters can include UE capability parameters which are fixed per hardware and software releases including for example UE category and other 3GPP mandatory or optional supported features, and so on. Such parameters also may include parameters that do not change over time until new release of software is flashed on the UE, for example a supported RATs list.

In one or more embodiments, instead of sending whole UE capability information, the UE can send only very little information in a UE capability information message. An example UE capability information message can comprise UE Class A information such as an enabled RATs list (5G, 4G, 3G, CDMA, and so on) parameter, and very few Class B parameters such as the OEM identifier (Apple, Samsung, LG, and so on), and a Hardware-Software-Release String.

At the core network level, the network and/or evolved NodeB (eNB) can query from the Home Location Registering (HLR) node for the UE's capabilities where for example the HLR node, or other network node dedicated for storing such database of the UE capabilities per OEM per hardware and software release, can contain different UE's OEMs data and can easily interpret UE capabilities on the fly instead of querying it from the UE. In one or more embodiments, the majority of the UE capability information will be available at the network side, and only very little information will be exchanged over the air.

Figure 9:
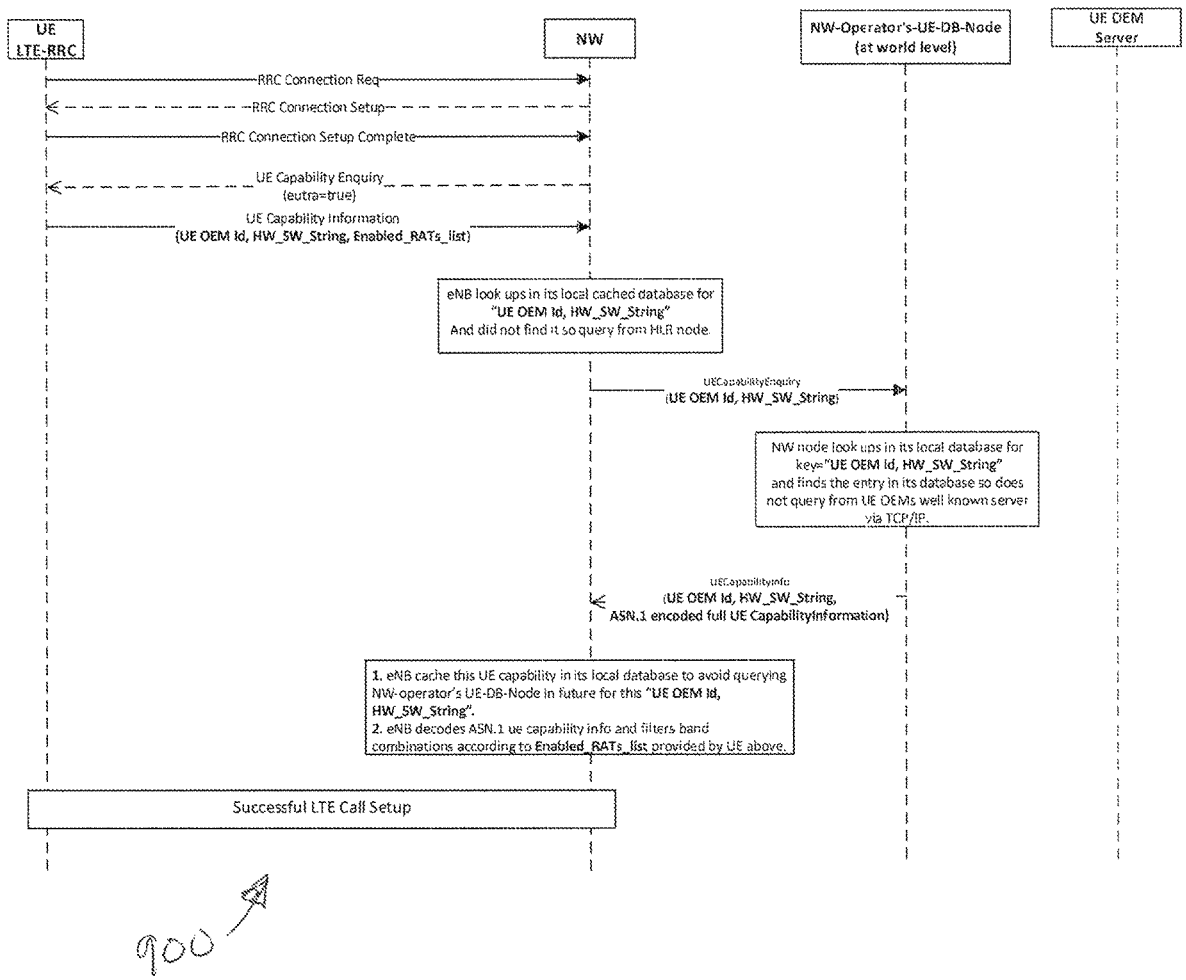
FIG. 9 is a diagram of UE Capability Enquiry/Information at the time of RRC connection establishment procedure when the UE was at least once attached to the network operator in the past in accordance with one or more embodiments.

Referring now to FIG. 9, a diagram of UE Capability Enquiry/Information at the time of RRC connection establishment procedure when the UE was at least once attached to the network operator in the past in accordance with one or more embodiments will be discussed. As shown in method 900 of FIG. 9, a message sequence chart shows the UE capability information exchange procedure where a particular type of UE (UE OEM ID, HW-SW-Release-String) was already ATTACHED to the network at least once in a past with a 4G or 5G RAT.

Figure 10:
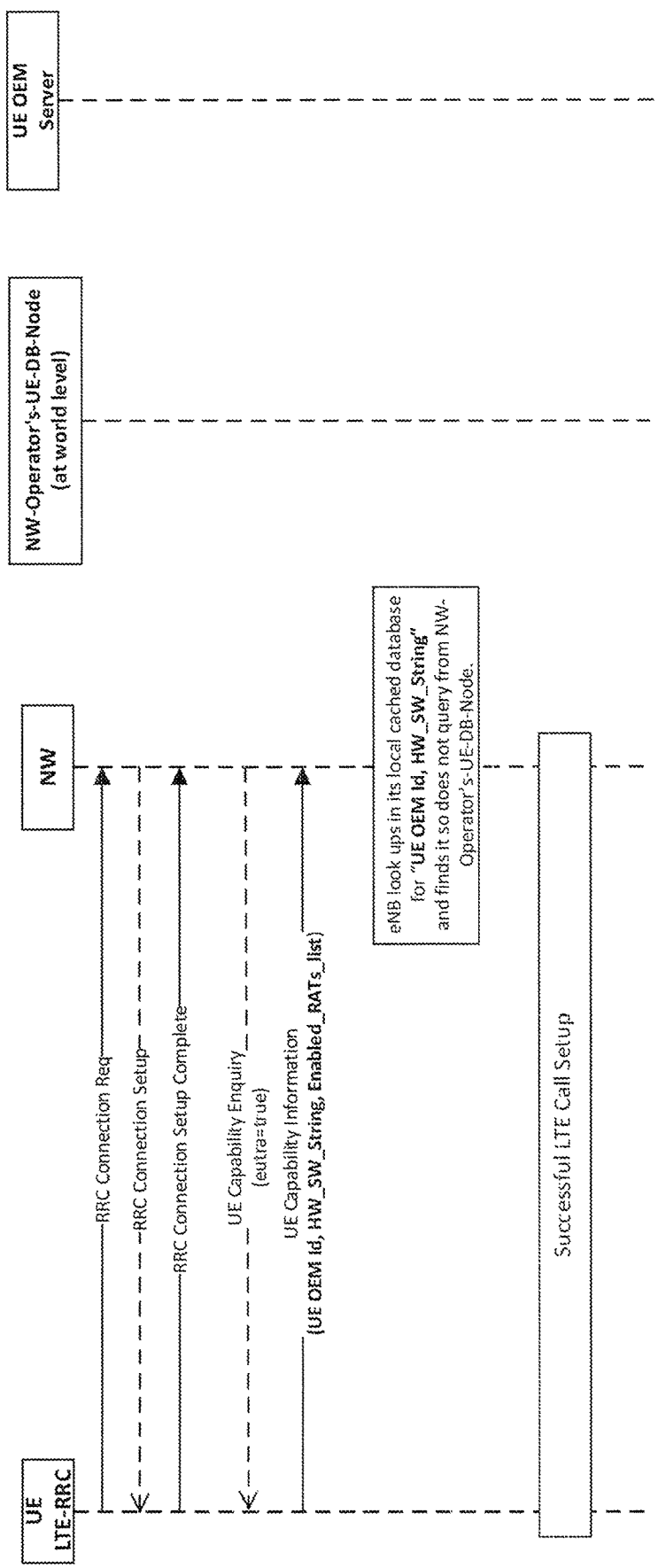
FIG. 10 is a diagram of UE Capability Enquiry/Information at the time of RRC connection establishment procedure when the UE was at least once attached to the network operator and the evolved NodeB (eNB) in the past in accordance with one or more embodiments.

Referring now to FIG. 10, a diagram of UE Capability Enquiry/Information at the time of RRC connection establishment procedure when the UE was at least once attached to the network operator and the evolved NodeB (eNB) in the past in accordance with one or more embodiments will be discussed.

As shown in method 1000 of FIG. 10, UE Capability Enquiry/Information at the time of RRC connection establishment procedure when such a UE (UE OEM ID, HW-SW-Release-String) was at least once ATTACHED to this network and with this eNB in past. Such a procedure is optional with the assumption that the eNB would like to reduce signaling overhead with the core network for this procedure.

Figure 11:
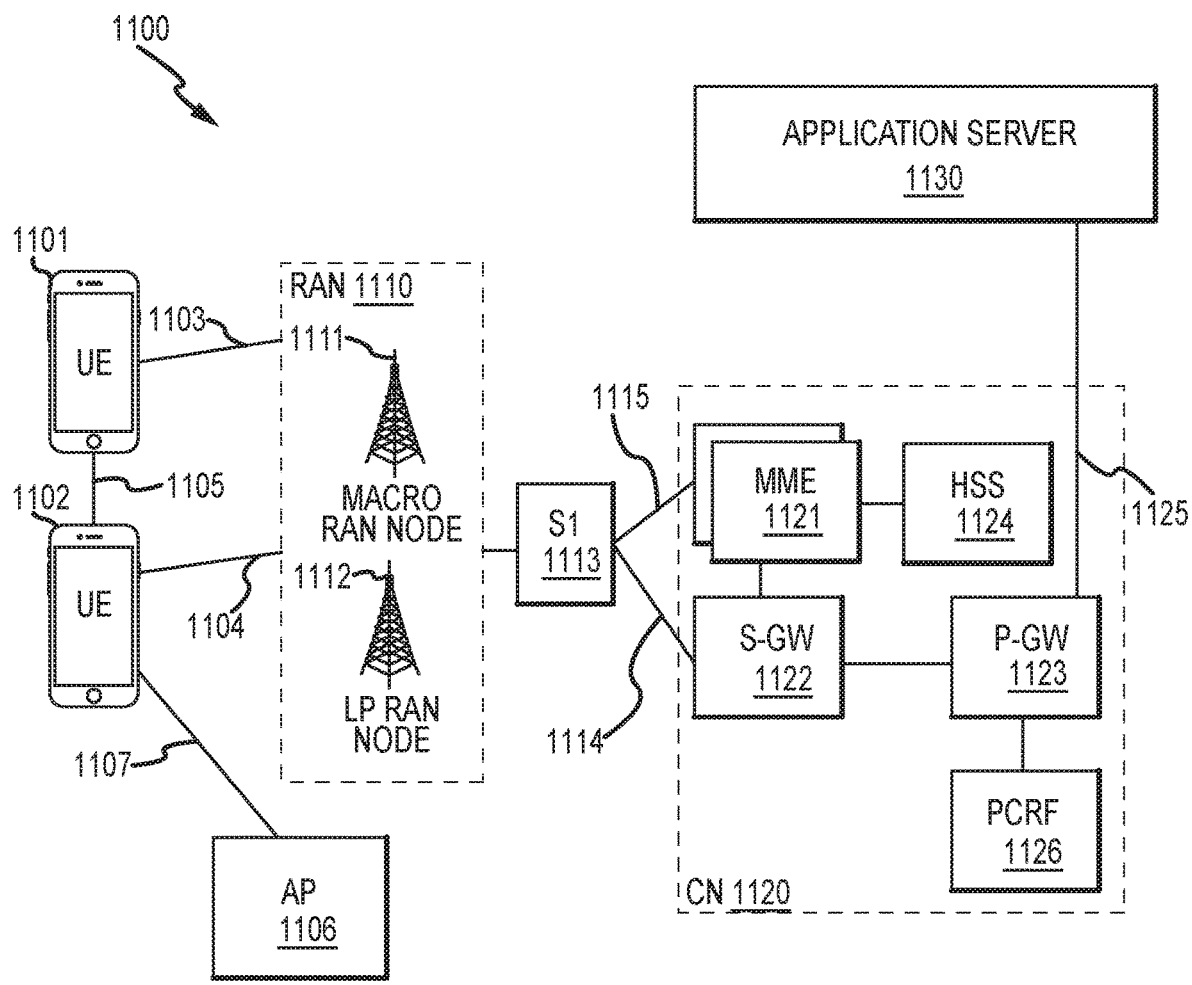
FIG. 11 illustrates an architecture of a system of a network in accordance with some embodiments.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1123 and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
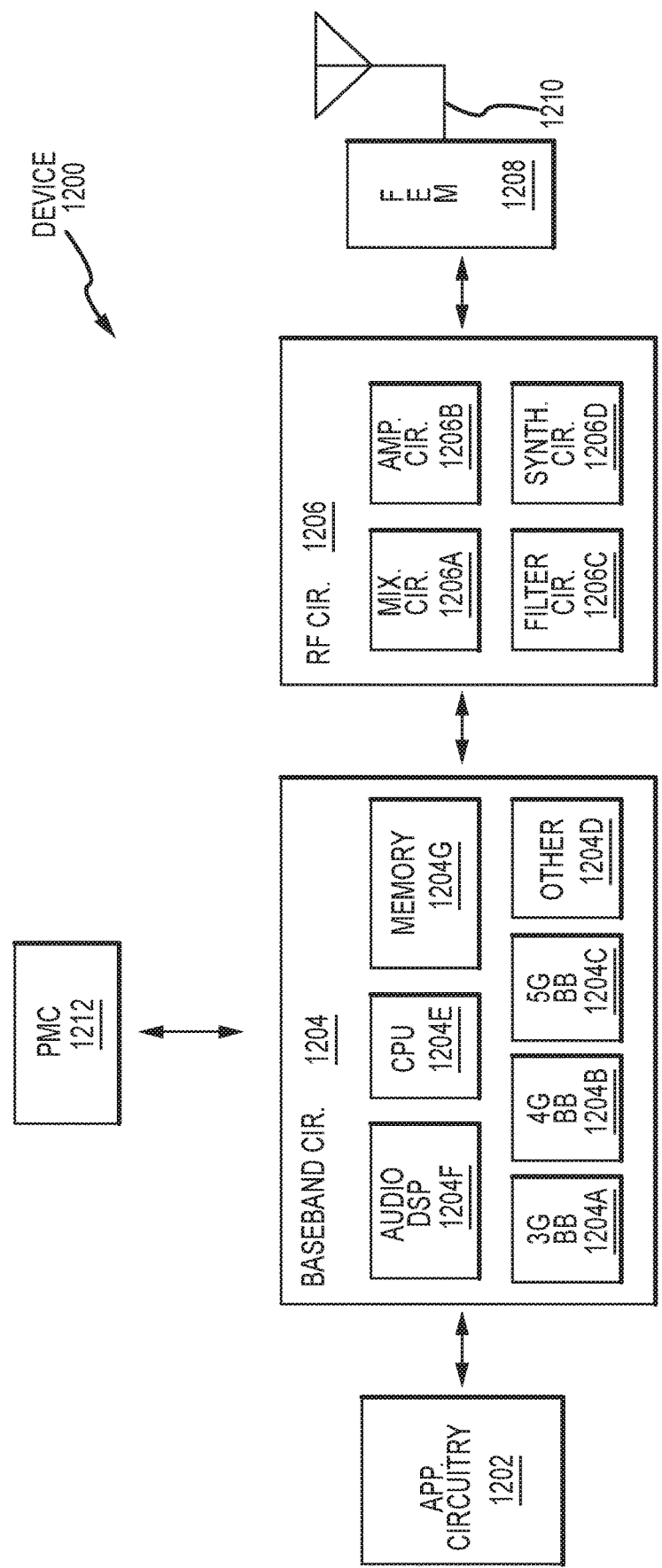
FIG. 12 illustrates example components of a device in accordance with some embodiments.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuity 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect. In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage-controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. In other embodiments, however, the PMC 12 12 may be additionally or alternatively coupled with, and perform similar power management operations for, other components such as, but not limited to, application circuitry 1202, RF circuitry 1206, or FEM 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
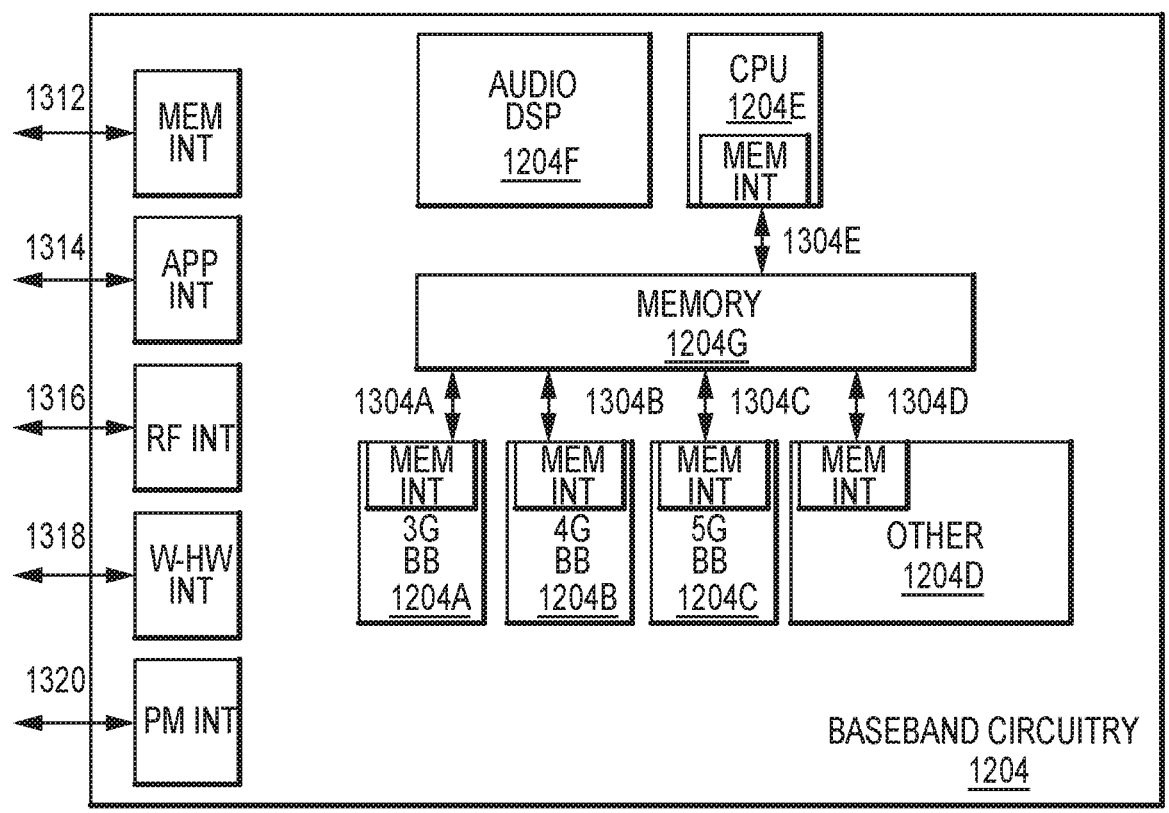
FIG. 13 illustrates example interfaces of baseband circuitry in accordance with some embodiments.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Although the claimed subject matter has been described with a certain degree of particularity, it should be recognized that elements thereof may be altered by persons skilled in the art without departing from the spirit and/or scope of claimed subject matter. It is believed that the subject matter pertaining to UE capabilities provisioning and retrieval in cellular networks and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. One or more processors configured to perform operations comprising:
   receiving, by a mobility management entity (MME), a user equipment (UE) Capabilities update from a remote server to update a UE capability database that stores UE capability information corresponding to one or more UEs identified with a unique identifier; and
   processing the UE Capabilities update, wherein the MME is configured to control the UE capability database and communicate with one or more base stations and wherein the remote server is remote from the MME, the one or more base stations and the one or more UEs.

2. The one or more processors of claim 1, wherein the UE Capabilities update is processed via one or more Application Programming Interfaces (APIs).

3. The one or more processors of claim 2, wherein the one or more APIs include an API for allowing registration as an owner of a UE Radio Capability Identifier (URCI) or a UE Capability Identifier (UCI), an API for querying UE capabilities with the registered owner of a URCI or UCI, an API for receiving UE Capabilities associated with the URCI or the UCI, or an API for deleting UE Capabilities associated with the URCI or the UCI, or a combination thereof.

4. The one or more processors of claim 1, wherein the MME is for a Long Term Evolution (LTE) network.

5. The one or more processors of claim 1, wherein the unique identifier is assigned by a Public Land Mobile Network (PLMN) with which the UE is associated.

6. One or more processors configured to perform operations comprising:
controlling, by a mobility and management entity (MME), a user equipment (UE) capabilities database;
receiving, by the MME, a UE capability information uplink message from a UE connected to a base station of a network; and
transmitting, by the MME, an enquiry to a remote server for UE capability information for the UE when the UE cannot be identified in the UE capabilities database based on the UE capability information uplink message, wherein the remote server is remote from the MME, the base station and the UE.

7. The one or more processors of claim 6, wherein the UE Capability information includes a UE Original Equipment Manufacturer Identifier (UE-OEM-Id), a hardware and software release (HW-SW-RELEASE) string, an evolved NodeB identifier (eNB ID), a list of disabled or unsupported radio access technologies (RATs), a list of supported RATs, a list of disabled or unsupported bands, a list of supported bands, or a list of end user controlled parameters, or a combination thereof.

8. The one or more processors of claim 7, wherein the operations further comprise:
retrieving the UE Capability information from a server of the UE OEM based on one or more parameters comprising the UE-OEM-Id, the HW-SW-RELEASE string, or another parameter, or a combination thereof.

9. The one or more processors of claim 6, wherein the operations further comprise:
retrieving the UE Capability Information from a serving gateway (SOW) or a Home Location Register (HLR) based on one or more parameters comprising the UE-OEM-Id, the HW-SW-RELEASE string, or another parameter, or a combination thereof.

10. The one or more processors of claim 6, wherein the UE Capability information is stored in the UE capabilities database as HW-SW-RELEASE, Full-Capability, or stored in an ASN.1 encoded format as key value pair type data formats wherein a key comprises "UE-OEM-Id", "HW-SW-RELEASE", or a value comprising "ASN.1 full UE capability", or a combination thereof.

11. The one or more processors of claim 6, wherein the operations further comprise:
calculating a current UE capability after fetching a full UE capability from a database cache or another network, wherein the one or more baseband processors are to exclude one or more bands associated with one or more disabled radio access technologies (RATS) including respective band combinations or one or more other parameters, or a combination thereof.

12. The one or more processors of claim 6, wherein the one or more MME is for a Long Term Evolution (LTE) network.

13. The one or more processors of claim 6, wherein the unique identifier is assigned by a Public Land Mobile Network (PLMN) with which the UE is associated.

14. A method, comprising:
controlling, by a mobility management entity (MME), a user equipment (UE) capabilities database;
receiving, by the MME, a UE capability information uplink message from a UE connected to a base station of a network; and
transmitting, by the MME, an enquiry to a remote server for UE capability information for the UE when the UE cannot be identified in the UE capabilities database based on the UE capability information uplink message, wherein the remote server is remote from the MME, the base station and the UE.

15. The method of claim 14, wherein the UE Capability information includes a UE Original Equipment Manufacturer Identifier (UE-OEM-Id), a hardware and software release (HW-SW-RELEASE) string, an evolved NodeB identifier (eNB ID), a list of disabled or unsupported radio access technologies (RATs), a list of supported RATs, a list of disabled or unsupported bands, a list of supported bands, or a list of end user controlled parameters, or a combination thereof.

16. The method of claim 15, further comprising:
retrieving the UE Capability information from a server of the UE OEM based on one or more parameters comprising the UE-OEM-Id, the HW-SW-RELEASE string, or another parameter, or a combination thereof.

17. The method of claim 14, further comprising:
retrieving the UE Capability information from a serving gateway (SGW) or a Home Location Register (HLR) based on one or more parameters comprising the UE-OEM-Id, the HW-SW-RELEASE string, or another parameter, or a combination thereof.

18. The method of claim 14, wherein the UE Capability information is stored in the UE capabilities database as HW-SW-RELEASE, Full-Capability, or stored in an ASN.1 encoded format as key value pair type data formats wherein a key comprises "UE-OEM-Id", "HW-SW-RELEASE", or a value comprising "ASN.1 full UE capability", or a combination thereof.

19. The method of claim 14, further comprising:
calculating a current UE capability after fetching a full UE capability from a database cache or another network, wherein the one or more baseband processors are to exclude one or more bands associated with one or more disabled radio access technologies (RATs) including respective band combinations or one or more other parameters, or a combination thereof.

* * * * *

UNITED STATES PATENT AND TRADEMARK OFFICE
CERTIFICATE OF CORRECTION

PATENT NO. : 11,671,822 B2
APPLICATION NO. : 16/376528
DATED : June 6, 2023
INVENTOR(S) : Stojanovski et al.

Page 1 of 1

It is certified that error appears in the above-identified patent and that said Letters Patent is hereby corrected as shown below:

In the Claims

Claim 9, Column 19, Line 48:
"gateway (SOW) or a Home Location Register (HLR)" should read as "gateway (SGW) or a Home Location Register (HLR)"

Signed and Sealed this
Twenty-fifth Day of July, 2023

Katherine Kelly Vidal
*Director of the United States Patent and Trademark Office*